United States Patent
Papuchon et al.

(10) Patent No.: US 7,548,367 B2
(45) Date of Patent: Jun. 16, 2009

(54) LASER ACTIVE OPTRONIC SYSTEM WITH IMPROVED DETECTIVITY

(75) Inventors: Michel Papuchon, Villebon/Yvette (FR); Jean-Paul Pocholle, La Norville (FR)

(73) Assignee: Thales (FR)

( * ) Notice: Subject to any disclaimer, the term of this patent is extended or adjusted under 35 U.S.C. 154(b) by 320 days.

(21) Appl. No.: 10/582,713

(22) PCT Filed: Dec. 9, 2004

(86) PCT No.: PCT/EP2004/053370
§ 371 (c)(1),
(2), (4) Date: Jun. 12, 2006

(87) PCT Pub. No.: WO2005/066653
PCT Pub. Date: Jul. 21, 2005

(65) Prior Publication Data
US 2007/0110435 A1    May 17, 2007

(30) Foreign Application Priority Data
Dec. 12, 2003    (FR)    ................... 03 14602

(51) Int. Cl.
*H01S 3/102* (2006.01)
*G02B 26/10* (2006.01)
(52) U.S. Cl. ............... 359/333; 356/318; 372/38.02; 372/38.03; 372/38.06; 372/38.1
(58) Field of Classification Search ................. 359/333; 356/318; 372/38.02, 38.03, 38.06, 38.1
See application file for complete search history.

(56) References Cited

U.S. PATENT DOCUMENTS

| | | | |
|---|---|---|---|
| 3,521,070 A | | 7/1970 | Rentzepis et al. |
| 4,197,006 A | | 4/1980 | Maillet |
| 5,448,582 A | * | 9/1995 | Lawandy ................. 372/42 |
| 5,454,058 A | * | 9/1995 | Mace et al. ............... 385/122 |
| 5,991,476 A | * | 11/1999 | Baney et al. ............... 385/16 |
| 6,298,180 B1 | * | 10/2001 | Ho ............................ 385/15 |

FOREIGN PATENT DOCUMENTS

| JP | 01267610 A | * | 10/1989 |
|---|---|---|---|
| WO | WO 02067057 A1 | * | 8/2002 |

* cited by examiner

*Primary Examiner*—Eric Bolda
(74) *Attorney, Agent, or Firm*—Lowe Hauptman Ham & Berner, LLP

(57) ABSTRACT

A laser active optronic system has an emission channel for the emission by an emission source of a laser beam which illuminates a target, and a receiving channel for receiving the wave backscattered by the target. An optical switching device is positioned in the receiving channel to receive the backscattered wave and has an optical gain medium and pumping means for pumping the gain medium. The gain medium is absorbent at the wavelength of the laser and becomes substantially transparent when it is pumped to allow the switching device to be actuated in the on mode or off mode respectively. A control unit for controlling the pumping means, allows the switching device to be actuated in the on mode in at least one temporal window of predetermined duration, triggered at a predetermined instant after the start of emission of the illuminating laser beam.

17 Claims, 2 Drawing Sheets

LASER ACTIVE OPTRONIC SYSTEM WITH IMPROVED DETECTIVITY

CROSS-REFERENCE TO RELATED APPLICATIONS

The present Application is based on International Application No. PCT/EP2004/053370, filed on Dec. 9, 2004, which in turn corresponds to FR 03/14602 filed on Dec. 12, 2003, and priority is hereby claimed under 35 USC §119 based on these applications. Each of these applications are hereby incorporated by reference in their entirety into the present application.

FIELD OF THE INVENTION

The invention relates to a laser active optronic system with improved detectivity, and applies in particular to an active imaging system or to a laser telemetry system, and in general to any active optronic system comprising a laser emission channel and a laser receive channel, and more particularly in systems referred to as "eye-safe".

BACKGROUND OF THE INVENTION

Laser active optronic systems have numerous applications, including in particular telemetry, based on the flight time measurement of a laser pulse emitted by the system and backreflected by the target, or active imaging systems in which a target to be imaged is illuminated by a non-natural source of the laser source type. For eye-safe reasons, it is necessary to avoid the use of emission sources whose wavelengths are in the visible. Eye-safe wavelength emission sources are preferred, that is to say those having wavelengths at which the regions of the eye anterior to the retina (the cornea, the aqueous humor and the lens) are absorbent so that the retina is protected from the impact of a laser beam in the eye. These wavelengths belong to the near infrared (typically above 1 µm) and the sources conventionally used are for example erbium-doped lasers (1.5 µm emission wavelength) or neodinium-doped lasers (1.06 µm emission source) which are associated with nonlinear optical devices such as optical parametric oscillators, in order to emit at wavelengths above 1 µm. The use of such sources requires, for the optronic systems, components (optic, receiver, etc.) that are sensitive to these wavelengths.

One reason for the insufficient detectivity in active optronic systems, of the active imaging or telemetry type, stems especially from the parasitic flux incident on the detector that is generated by atmospheric scattering over the first one hundred meters or so of the optical path between the system and the target. This parasitic flux may generate a detection signal of amplitude greater than that resulting from the flux backreflected by the target, which may be several kilometers from the system.

One way of obviating this problem consists in switching the detection capability of the receiver of the optronic system in order to make it inoperable over a given duration, by installing an electronic device in the detector itself. This technique does not depend on the wavelength used—it is therefore operative in eye-safe optronic systems. However, it may be necessary to obtain very short switching times, for example for the construction of imaging systems with distance resolution. In this case, the electronic switching device must have a large bandwidth and is a noise generator.

SUMMARY OF THE INVENTION

The invention provides an active optronic system with improved detectivity, making it possible to limit the parasitic flux due to backscattering on the atmosphere, thanks to a controlled switching device. It is based on the implementation, in the receive channel of the optronic system, of an optical switching device using an optical gain medium pumped by pumping means that are controlled by a control unit, allowing the switching device to be actuated with a very short switching time (of the order of a nanosecond) and compatible with eye-safe systems.

More precisely, the invention proposes a laser active optronic system comprising a channel for the emission by an emission source of a laser beam illuminating a target and a channel for receiving the wave backscattered by the target. An optical switching device is positioned in the receive channel, said optical switching device receiving said backscattered wave and comprising an optical gain medium and pumping means for pumping said gain medium, said gain medium being absorbent at the wavelength of the laser and becoming substantially transparent when it is pumped, in such a way as to allow the switching device to be actuated in the on mode or off mode respectively. The system further includes a control unit for controlling the pumping means, allowing the switching device to be actuated in the on mode in at least one temporal window of predetermined duration, triggered at a predetermined instant after the start of emission of the illuminating laser beam.

The use of an optical gain medium may further allow the signal backreflected by the scene to be amplified, thus increasing the sensitivity of the system.

BRIEF DESCRIPTION OF THE DRAWINGS

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

In the figures, identical elements are indicated by the same reference numbers.

DETAILED DESCRIPTION OF THE INVENTION

Figure 1A:
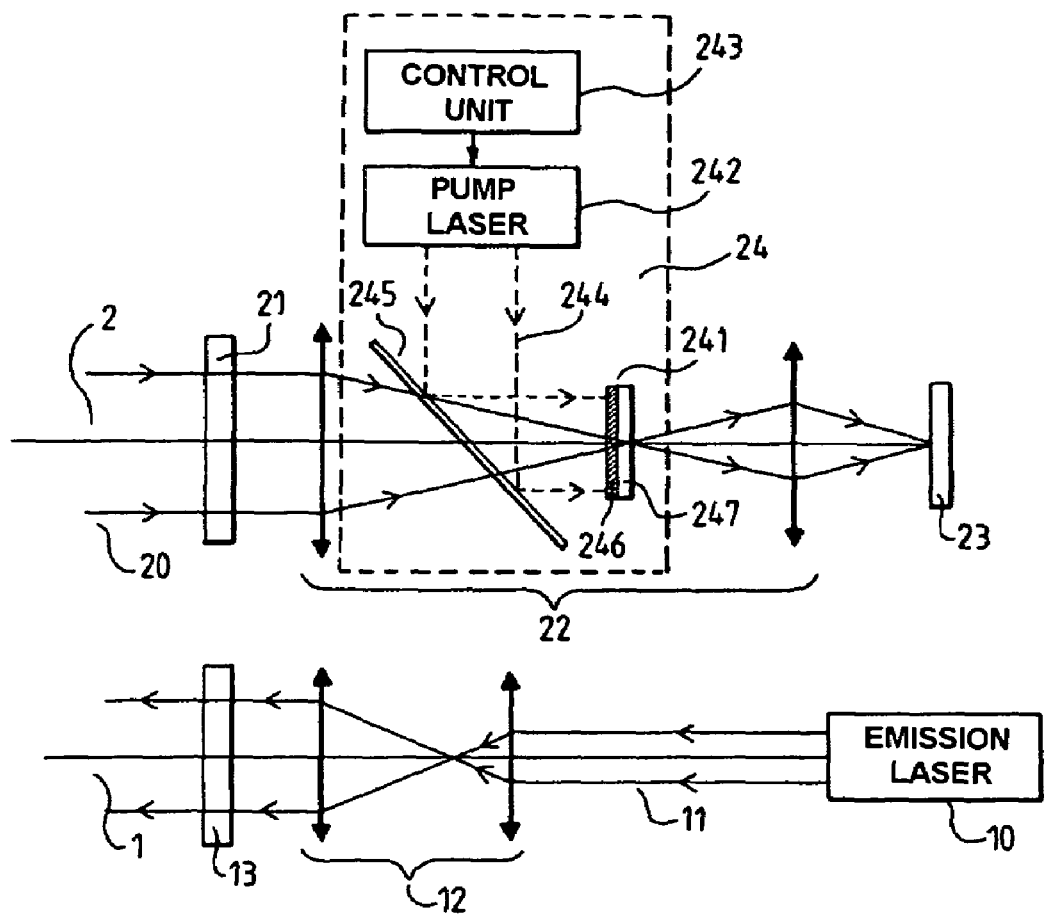
FIGS. 1A and 1B, diagrams of one example of an optronic system according to the invention in two embodiments.

FIG. 1A shows, in the form of a simplified diagram, one example of a laser active optronic system, according to the invention. This is for example a telemetry system or an active imaging system. It comprises a channel 1 for the emission of a laser beam for illuminating a target and a channel 2 for receiving the wave backscattered by the target. In this example, the two channels are separate, but the system could just as well be monostatic, that is to say one having an input window common to the two channels. The channel 1 comprises, in a known manner, a source 10 for emitting a laser beam 11 intended for illuminating a target (not shown), a beam-shaping objective 12, and an output window 13. The laser emission source is advantageously a pulse source, but a continuous or quasi-continuous emission source is also conceivable in certain applications, especially in active imaging. The receive channel 2 for the beam 20, corresponding to the light flux backscattered by the target, further includes the input window 21 and an objective 22, which is intended to focus the light beam 20 onto detection means 23 connected to an electronic signal processing device (not shown).

According to the invention, an optical switching device 24 that receives the backscattered wave 20 is positioned in the receive channel 2. This device comprises an optical gain medium 241 and pumping means 242 for pumping the gain medium, such that the gain medium is absorbent and the wavelength of the emission laser 10 becomes substantially transparent when it is pumped, in such a way as to allow the switching device to be actuated in the off mode or on mode respectively. The switching device further includes a control unit 243 for controlling the pumping means, allowing the switching device to be actuated in the on mode in at least one temporal window of predetermined duration, triggered at a predetermined instant after the start of emission of the illuminating laser beam.

In the example shown in FIG. 1A, the optical gain medium 241 is positioned in an intermediate focal plane of the receive channel, thereby making it possible to limit the size of said medium. It is also conceivable to position the gain medium in a pupil plane when no intermediate focal plane is accessible and when the construction of a gain medium of larger size entails no technological difficulty.

In this example, the pumping means are optical pumping means, comprising a source 242 for emitting a pump beam 244 intended to pump said gain medium 241. A plate 245 which is reflecting or partially reflecting at the wavelength of the pump beam 244 sends said beam to the gain medium.

Figure 1B:
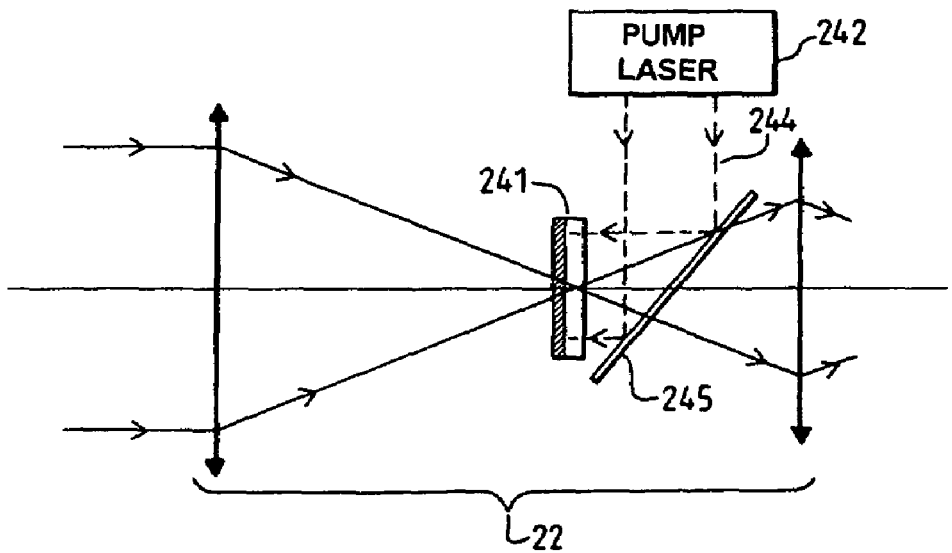

The example of FIG. 1A shows the pumping of the gain medium in the direction of propagation of the incident flux. It may be advantageous, as shown in the partial view of FIG. 1B, for the pump beam 244 to propagate in the gain medium 241 in the direction opposite to the direction of propagation of the incident flux in the system, in order to limit the possible parasitic flux on the detector 23. In this case, the partially reflecting plate 245 is located between the gain medium 241 and the detector 23.

Depending on the pumping wavelength of the gain medium chosen, the pump beam may be extracted from the emission source 10, thereby making it possible for the overall size of the optronic system to be reduced. The pumping means may also be electrical pumping means where the gain medium so allows. This makes it possible to dispense with an additional laser source.

Figure 2:
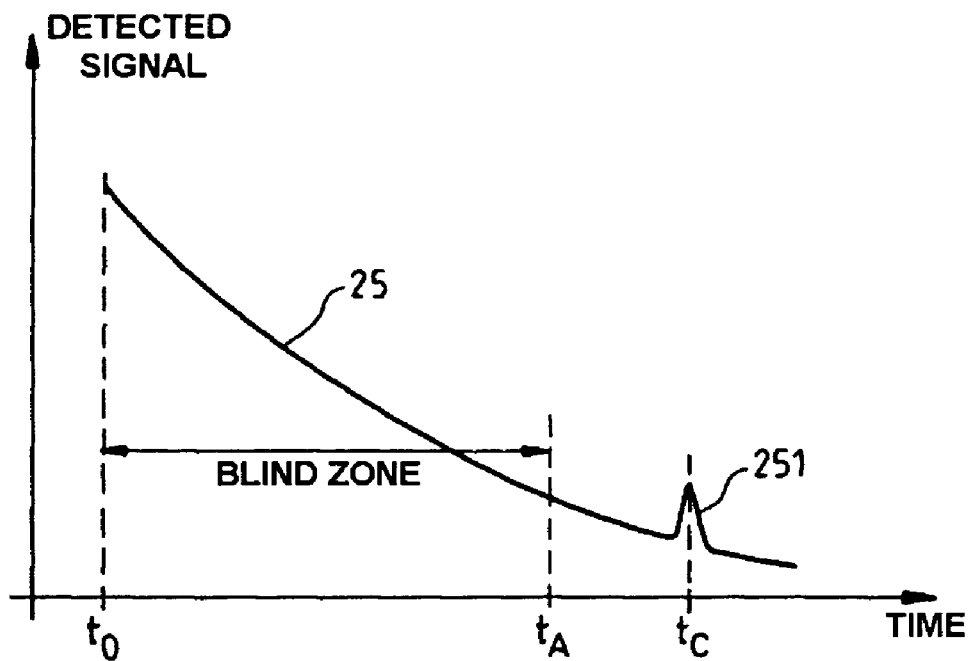
FIG. 2, a diagram illustrating the return signal plotted as a function of time.

The laser active optronic system according to the invention may therefore operate in the following manner, as illustrated by the diagram in FIG. 2. In this example, it is assumed that the emission source 10 is a pulse source that sends a pulse at time $t_0$ a target of which it is desired for example to take an image. The curve 25 of FIG. 2 shows the signal detected by the detection means 23 (FIG. 1A) as a function of time. This curve shows that the signal comprises a very large component corresponding to the flux emitted by the emission source and backscattered by the atmosphere before it reaches the target. As curve 25 shows, this flux decreases with time, but its amplitude may be very large compared with the flux backscattered by the target itself, corresponding in FIG. 2 to the signal denoted by 251, which target may be at a distance of several kilometers from the optronic system. Thanks to the switching system according to the invention, it is possible to generate a blind zone that corresponds to a temporal window during which the switch is in the off mode. Thus, in FIG. 2, the switch is in the off mode between time $t_0$ when the pulse is emitted and a time $t_A$ which defines the blind distance zone of the imaging system. A target located at a greater distance sends an echo signal 251 at a time denoted $t_C$. It is thus possible to suppress a large part of the parasitic light flux incident on the detection means 23.

The switching device of the system according to the invention employs a gain medium pumped by pumping means, which are themselves controlled by a control unit so as to define the blind zone. To obtain such a functionality, the gain medium is chosen in such a way that, when it is not pumped, it is absorbent at the wavelength of the emission laser and becomes substantially transparent, or even exhibits optical gain, when it is pumped. Certain known gain media of the prior art, described below, may operate at wavelengths of longer than 1 micron. This allows the invention to be applied to eye-safe optronic systems. Moreover, the gain of this type of material is substantially isotropic, this being particularly beneficial in the case of active imaging for which the viewing angle may be large. Furthermore, certain gain media have very short response times, such as semiconductor-type materials. This may provide additional functionalities, which will be described later.

Similarly, since these materials are by their principle switched-gain amplifiers, they may advantageously be used to amplify the level of the signal backscattered by the target, thus making it possible to optimize the laser power needed to obtain a specified range. In this way it is possible to minimize the size and the power of the laser source and thus make it easier to integrate the system into optronic units requiring to be very compact and having few electrical power options. Moreover, the system according to the invention makes it possible, at equivalent laser power, to increase the range of the system.

Many well-known gain media of the prior art may be used for implementing the switching device of the optronic system according to the invention.

For example, the gain medium is a semiconductor material whose gain band is adjusted by modifying the composition. This may for example be a material of the GaInAsP type produced by epitaxy and well known in the prior art. One advantage of semiconductor materials is the possibility of electrical pumping, which may simplify the optical configuration of the system by not requiring a pump laser. For example in the case of an optronic system implementing a laser emission source operating at 1.54 μm, it will be possible to use a compound of the GaInAsP type of suitable composition. The pumping may be electrical or optical, at 0.98 μm or at 0.8 μm (the wavelength of diode lasers conventionally used for pumping solid-state lasers of the Nd:YAG type). As in the example shown in FIG. 1, the gain medium may be formed from a semiconductor multilayer stack 246, typically with a thickness of the order of 1 micron, on a substrate 247.

According to another example, it is possible to use the properties of certain rare earths incorporated into transparent matrices, the condition corresponding to maximum absorption of the device when it is not pumped being satisfied with materials of the three-level type. For example, it is possible to use as gain medium erbium ions in glass for emission laser wavelengths in the region of 1.54 μm.

Figure 3:
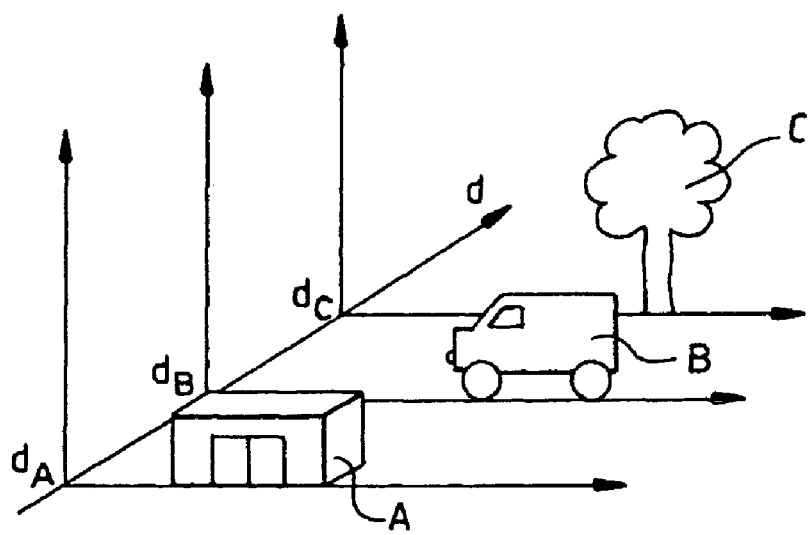
FIG. 3, a diagram illustrating one example of the use of the device according to the invention.

According to an alternative method of implementing the laser active optronic system according to the invention, it is possible to generate temporal windows corresponding to different distance doors. Thus, the example of FIG. 3 shows 3 targets A, B and C located at distances $d_A$, $d_B$ and $d_C$ from the optronic system. By controlling the means for pumping the gain medium, it is possible for the instant of the distance doors to be varied in order to analyze the scene plane by plane. Moreover, by using gain media of the semiconductor type, which have very rapid response times, it is possible to obtain very fine distance doors and thus achieve a target distance resolution for three-dimensional imaging.

Apart from the three-dimensional imaging application, the distance resolution may be useful for other applications such as, for example, profilometry, which involves the analysis by a monodetector of the return profile of a pulse train. This profile provides a signature of the observed target.

According to an alternative embodiment, the gain medium is formed from a substantially uniform block. For certain applications, it may be beneficial to have an "pixelated" gain medium. For example in the case of a semiconductor gain medium, it is possible to use a matrix of optical gain elements, typically of the order of 10 microns in size, it being possible for said elements to be selectively pumped by the pumping means, for example electrical pumping means. In particular, this allows applications of the laser threat protection type by suppressing, by turning off the switching device, a possible laser blinding point on the detection means. The same functionality may be obtained in a gain medium formed from a uniform block with optical pumping means which include, apart from the source for emitting a pump beam, a spatial light modulator to which the pump beam is sent, making it possible for the various regions of the gain medium, which are distributed over the entire block in a two-dimensional matrix, to be selectively actuated. Thus, the gain medium is "pixelated" by the configuration of the pumping means by as many elementary pump beams.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A laser active optronic system, comprising:
an emission channel for the emission by an emission source of a laser beam illuminating a target,
a receiving channel for receiving a backscattering wave backscattered by the target, and
a switching device positioned in the receiving channel, wherein said switching device is an optical switching device controlled by a control unit, said control unit activating the switching device into an ON mode at a predetermined instant after the start of emission of the illuminating laser beam, so that the backscattering wave passes through at least one temporal window for a predetermined duration, and wherein the switching device is in an OFF mode at least until said predetermined instant, so as to suppress part of a parasitic light flux incident in the reception channel and
wherein the optical device comprises an optical gain medium and pumping means for pumping said gain medium, said optical gain medium being absorbent at the wavelength of the laser when not pumped, and the switching device is in the OFF mode, and becoming substantially transparent when the laser is pumped, and the switching device is in the ON mode.

2. The optronic system as claimed in claim 1, wherein the pumping rate is adjusted to amplify the backscattered wave.

3. The optronic system as claimed in claim 1, wherein the pumping means comprises an optical pumping means comprising a source for emitting a pump beam for pumping the gain medium.

4. The optronic system as claimed in claim 3, wherein the source for emitting the pump beam means is extracted from the source for emitting the target-illuminating beam, and the ON mode of the optical switching device is such that amplification of the backscattered wave is absent.

5. The optronic system as claimed in claim 1, wherein the optical switching device is positioned near an intermediate focal plane.

6. An active imaging optronic system as claimed in claim 3, wherein the gain medium is formed from a uniform block and wherein said optical pumping means further comprises a spatial light modulator to which said pump beam is sent, to selectively actuate various regions of the gain medium, which regions are distributed over the entire block in a two-dimensional matrix.

7. The active imaging optronic system as claimed in claim 5, wherein the gain medium is arranged as a matrix of optical-gain elements, enabling selective actuation of said elements by said pumping means.

8. The optronic system as claimed in claim 1, wherein the gain medium is a semiconductor material.

9. The optronic system as claimed in claim 8, wherein the gain medium is a semiconductor material pumped by optical pumping means.

10. The optronic system as claimed in claim 8, wherein the gain medium is a semiconductor material pumped by electrical pumping means.

11. The optronic system as claimed in claim 8, in which said semiconductor material is of the GaInAsP type, the composition of which is adapted according to the wavelength of the emission laser beam.

12. The optronic system as claimed in claim 1, wherein the gain medium is a transparent material which contains erbium ions, and which forms a three state level material which assumes a state of maximum absorption while not pumped, and wherein the pumping means optically pumps at a wavelength of 0.98 or 1.48 microns.

13. The optronic system as claimed in claim 1, wherein the control unit is programmed to actuate the switching device in on mode according to several temporal windows corresponding to different distance doors for analyzing a scene in three dimensions.

14. The optronic system as claimed in claim 12, wherein the control unit is programmed to actuate the switching device in ON mode according to several temporal windows corresponding to different distance doors for analyzing a scene in three dimensions.

15. A laser active optronic system, comprising:
an emission channel for the emission by an emission source of a laser beam illuminating a target;
a receiving channel for receiving a backscattering wave backscattered by the target;
an optical switching device positioned in the receiving channel and controlled by a control unit so as to have an ON mode and OFF mode, the optical switching device comprising
an optical gain medium and an optical pump,
said optical gain medium comprising a doped transparent material, that forms a three state level material which assumes a state of maximum absorption while not pumped, the optical gain medium being absorbent at the wavelength of the laser when the switching device is in the OFF mode and the optical gain material is not optically pumped, and substantially transparent when the switching device is in the ON mode and the optical gain material is pumped by the optical pump, and wherein:

the control unit is configured to:

activate the switching device into the ON mode at a predetermined instant after the start of emission of the illuminating laser beam, so that the backscattering wave passes through at least one temporal window for a predetermined duration, and maintain the OFF mode at least until said predetermined instant, so as to suppress part of a parasitic light flux incident in the reception channel.

16. The optronic system as claimed in claim 15, wherein the optical pump optically pumps at a wavelength of 0.98 or 1.48 microns.

17. The optronic system as claimed in claim 15, wherein the optical gain material is doped with erbium ions.

* * * * *